United States Patent [19]

Yuasa

[11] Patent Number: 5,418,846
[45] Date of Patent: May 23, 1995

[54] CALL WAITING INDICATING METHOD AND SYSTEM

[75] Inventor: Yuuichi Yuasa, Tokyo, Japan

[73] Assignee: NEC Corporation, Tokyo, Japan

[21] Appl. No.: 198,488

[22] Filed: Feb. 18, 1994

[30] Foreign Application Priority Data

Feb. 24, 1993 [JP] Japan .................................. 5-033867

[51] Int. Cl.$^6$ ............................................. H04M 3/42
[52] U.S. Cl. .................................... 379/215; 379/218;
379/207; 379/201
[58] Field of Search ................. 379/201, 215, 207, 218

[56] References Cited

U.S. PATENT DOCUMENTS 4,277,649  7/1981  Sheinbern ............................ 379/215
4,947,421  8/1990  Toy et al. ............................. 379/215

Primary Examiner—James L. Dwyer
Assistant Examiner—Daniel S. Hunter
Attorney, Agent, or Firm—Ostrolenk, Faber, Gerb & Soffen

[57] ABSTRACT

According to a call waiting indicating method and system, a selection number consisting of a terminating subscriber number and a predetermined special number dialed by an originating subscriber and requesting an originating subscriber-initiating call waiting service is received. The received selection number is analyzed to determine whether a terminating subscriber corresponding to the terminating subscriber number rejects the originating subscriber-initiated call waiting service. A connection request is notified to a busy terminating subscriber speaking to a partner subscriber when it is determined that the terminating subscriber does not reject the originating subscriber-initiated call waiting service. A response representing approval signal is received from the busy terminating subscriber in response to notification of the connection request. The partner subscriber is temporarily held upon detection of the approval signal from the terminating subscriber, and a network is driven to connect the terminating subscriber to the originating subscriber.

12 Claims, 3 Drawing Sheets

CALL WAITING INDICATING METHOD AND SYSTEM

BACKGROUND OF THE INVENTION

The present invention relates to a call waiting indicating method and system and, more particularly, to an originating subscriber-initiated call waiting indicating method and system, in which an originating subscriber can talk to a busy terminating subscriber in accordance with the will of the originating subscriber.

In a conventional telephone switching system, a so-called call waiting service is offered to a subscriber as a service for calling the subscriber even if his or her line is busy. This call waiting service is offered to only a subscriber to allow connection in a busy state. At the same time, when a call is made to a non-subscriber in a busy state, a busy tone is sent back to the originating subscriber, and connection to the terminating subscriber in a busy state is not performed.

In the conventional call waiting service, the connection is allowed in a busy state, depending on the subscription conditions of the terminating subscriber. For this reason, if the originating subscriber wants to urgently talk to a busy non-subscriber, this terminating call is not allowed. The originating subscriber must call this terminating subscriber again upon an ON-hook of the terminating subscriber.

SUMMARY OF THE INVENTION

It is an object of the present invention to provide an originating subscriber-initiated call waiting indicating method and system in which an originating subscriber can initiate a call waiting service to a busy terminating subscriber in accordance with the will of the originating subscriber.

In order to achieve the above object of the present invention, there is provided a call waiting indicating method, comprising the steps of receiving a selection number consisting of a terminating subscriber number and a predetermined special number dialed by an originating subscriber and requesting an originating subscriber-initiating call waiting service, analyzing the received selection number to determine whether a terminating subscriber corresponding to the terminating subscriber number rejects the originating subscriber-initiated call waiting service, notifying a connection request to a busy terminating subscriber speaking to a partner subscriber when it is determined that the terminating subscriber does not reject the originating subscriber-initiated call waiting service, detecting a response representing approval of OFF-hook from the busy terminating subscriber in response to notification of the connection request, and temporarily holding the partner subscriber upon detection of OFF-hook from the terminating subscriber, and driving a network to connect the terminating subscriber to the originating subscriber.

DESCRIPTION OF THE PREFERRED EMBODIMENT

Figure 1:
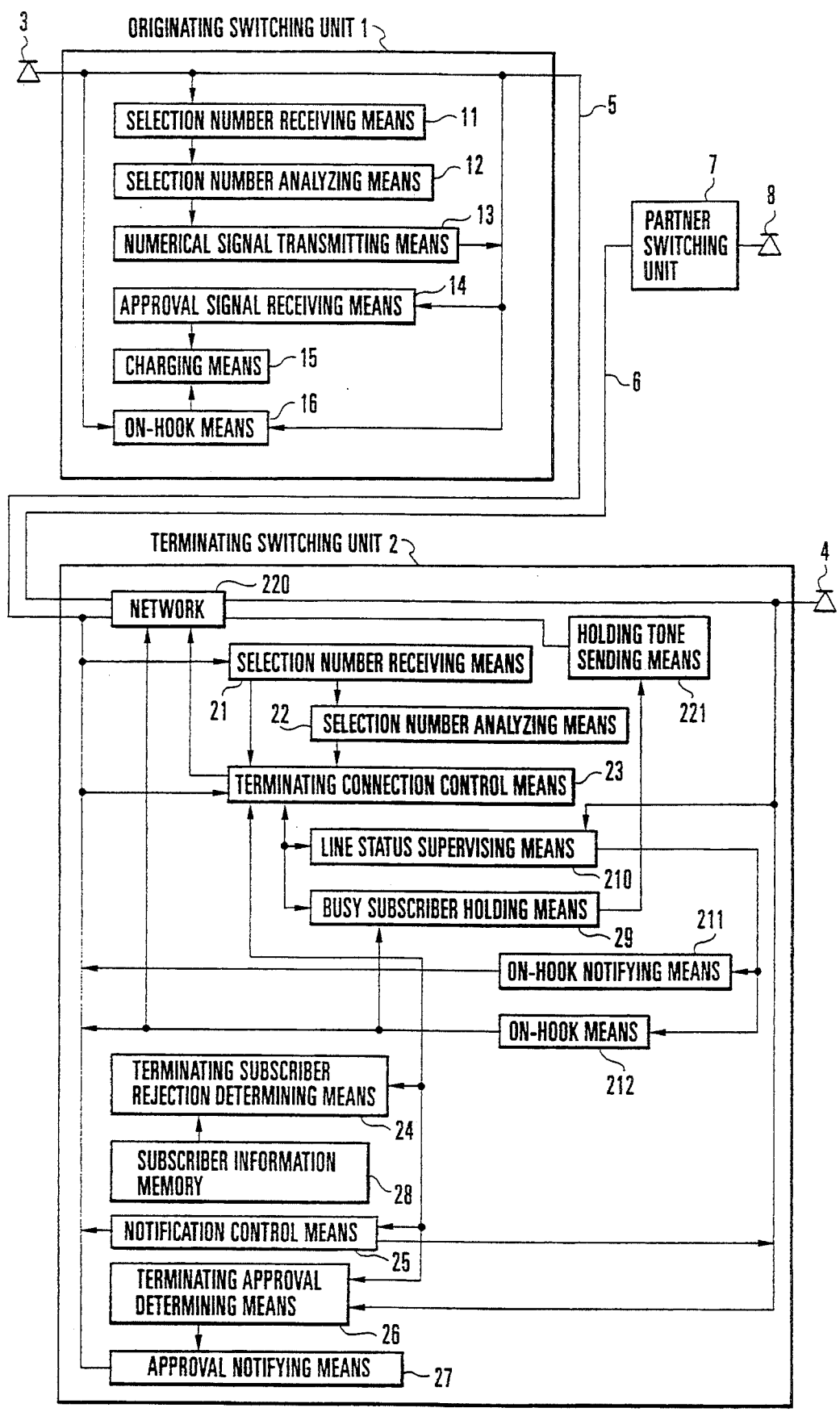
FIG. 1 is a block diagram showing an originating subscriber-initiated call waiting indicating system according to the present invention.

The present invention will be described in detail with reference to the accompanying drawings. FIG. 1 shows an originating subscriber-initiated call waiting indicating system according to an embodiment. The call waiting indicating system according to the present invention comprises an originating switching unit 1 for accommodating an originating subscriber 3 and a terminating switching unit 2 for accommodating a terminating subscriber 4. The originating switching unit 1 is connected to the terminating switching unit 2 thorough a trunk line 5.

The originating switching unit 1 comprises a selection number receiving means 11 for receiving a selection number represented by a DTMF (Dual Tone Multi-Frequency) output upon a key input by the originating subscriber 3, a selection number analyzing means 12 for analyzing a numerical signal (selection number) received by the selection number receiving means 11, a numerical signal transmitting means 13 for transmitting a numerical signal analyzed by the selection number analyzing means 12, onto the trunk line 5, an off-hook signal receiving means 14 for receiving an off-hook signal from the terminating subscriber 4 in response to an originating subscriber-initiated call waiting service request sent from the terminating switching unit 2 through the trunk line 5, a charging means 15 for starting charging processing to the originating subscriber 3 in accordance with an OFF-hook signal reception output of the terminating subscriber 4 from the OFF-hook signal receiving means 14, and an ON-hook means 16 for outputting an ON-hook signal to the charging unit 15 at the end of speech communication between the originating subscriber 3 and the terminating subscriber 4 to complete charging processing. The numerical signal transmitted from the originating subscriber 3 consists of a predetermined special number for requesting the originating subscriber-initiated call waiting service and a subscriber number of the terminating subscriber 4.

The terminating switching unit 2 comprises a selection number receiving means 21 for receiving a selection number from the originating switching unit 1 through the trunk line 5, a selection number analyzing means 22 for analyzing a numerical signal received from the selection number receiving means 21 to determine whether a connection request is an originating subscriber-initiated call waiting service request on the basis of the special number, a terminating connection control means 23 for performing terminating control on the basis of the terminating subscriber number in the selection number received by the selection number receiving means 21 when the selection number analyzing means 22 determines that the request is the originating subscriber-initiated call waiting service request, a subscriber information memory 28 for storing subscriber information representing rejection of an originating subscriber-initiated call waiting service request registered in advance for each terminating subscriber 4, a terminating subscriber rejection determining means 24 for determining on the basis of the subscriber information stored in the subscriber information memory 28 whether the terminating subscriber 4 specified by the selection number is a terminating subscriber who rejects this call waiting service, a notification control means 25 for notifying the originating subscriber 3 of terminating rejection of the terminating subscriber 4 when the terminating subscriber rejection determining means 24 determines that the terminating subscriber 4 is a terminating subscriber who rejects this service, and for notifying the terminating subscriber 4 of the originating subscriber-initiated call waiting service request by means of a ringing signal when the terminating subscriber 4 is determined not to be a terminating subscriber who rejects this service and sending a ring back tone representing calling of the terminating subscriber 4 to the originating subscriber 3, a terminating approval determining means 26 for detecting a DTMF signal representing an approval signal, e.g., a hooking signal or special number representing call termination from the originating subscriber 4 in response to the notification of the originating subscriber-initiated call waiting service request, and for determining approval of call termination, an OFF-hook notifying means 27 for sending back an OFF-hook signal based on the determination result of the terminating approval determining means 26 to the originating switching unit 1, a busy subscriber holding means 29 for temporarily holding a partner subscriber 8 accommodated in a partner switching unit 6 set in a busy state with the terminating subscriber 4, a line status supervising means 20 for supervising the line status between the originating subscriber 3 and the terminating subscriber 4 to detect an ON-hook operation, an ON-hook notifying means 211 for sending, to the originating switching unit 1, an ON-hook signal in accordance with an ON-hook detection output, from the line status supervising means 210, representing the ON-hook state between the originating subscriber 3 and the terminating subscriber 4, and for releasing holding of the partner subscriber set in a temporary holding state in the busy subscriber holding means 29, an ON-hook means 212 for sending a disconnect signal representing disconnection of the terminating subscriber 4 from the partner subscriber 8 at the end of speaking to the partner switching unit 7 through the trunk line 5, a network 220 serving as a switching connecting means for connecting the terminating subscriber 4 to the originating subscriber 3 and the partner subscriber 8, and a holding tone sending means 221 for sending a holding tone to the held partner subscriber 8 through the network 220 and the trunk line 6.

Figure 2:
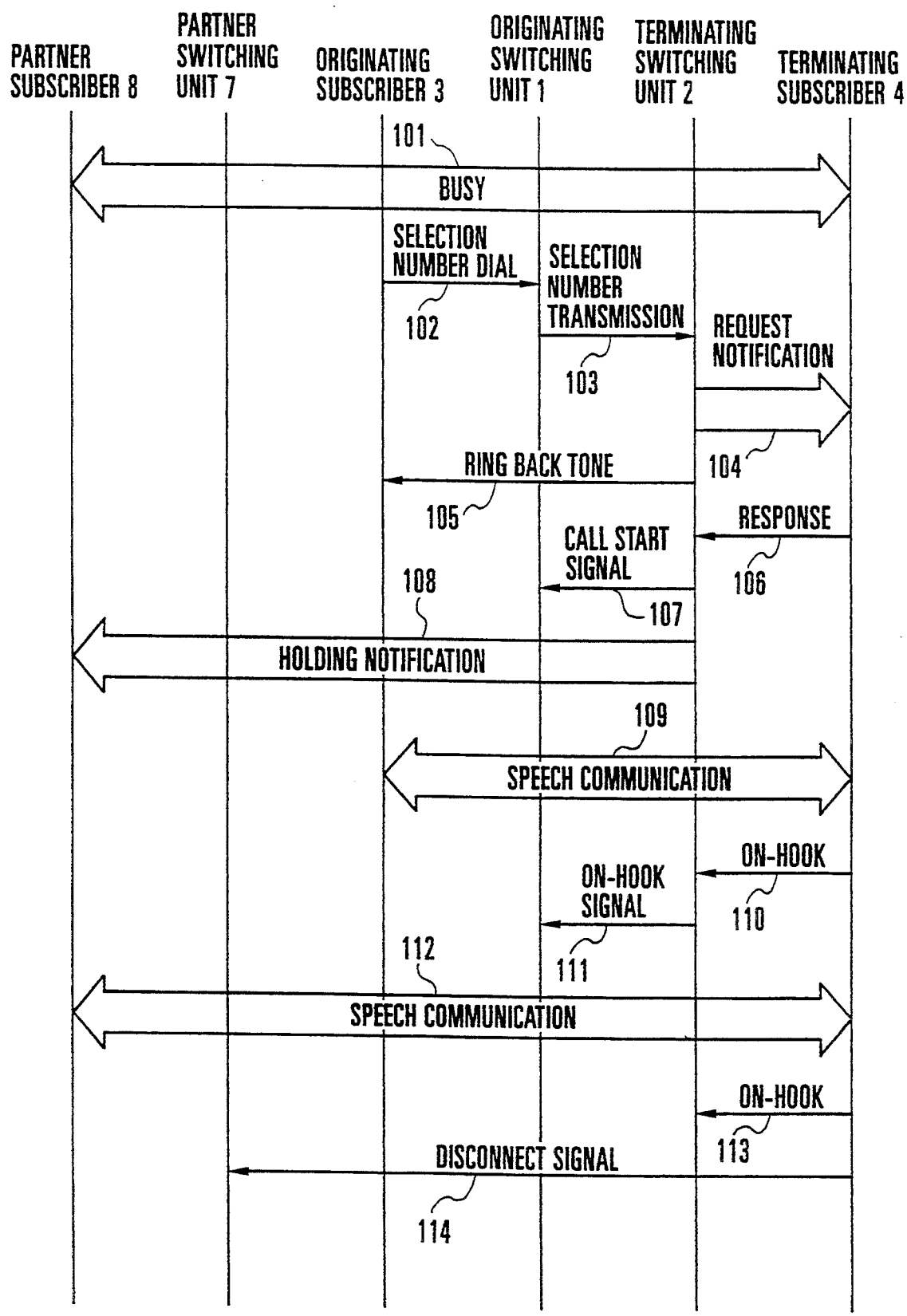
FIG. 2 is a view showing a transmission/reception sequence of signals between an originating switching unit and a terminating switching unit in FIG. 1.
Figure 3:
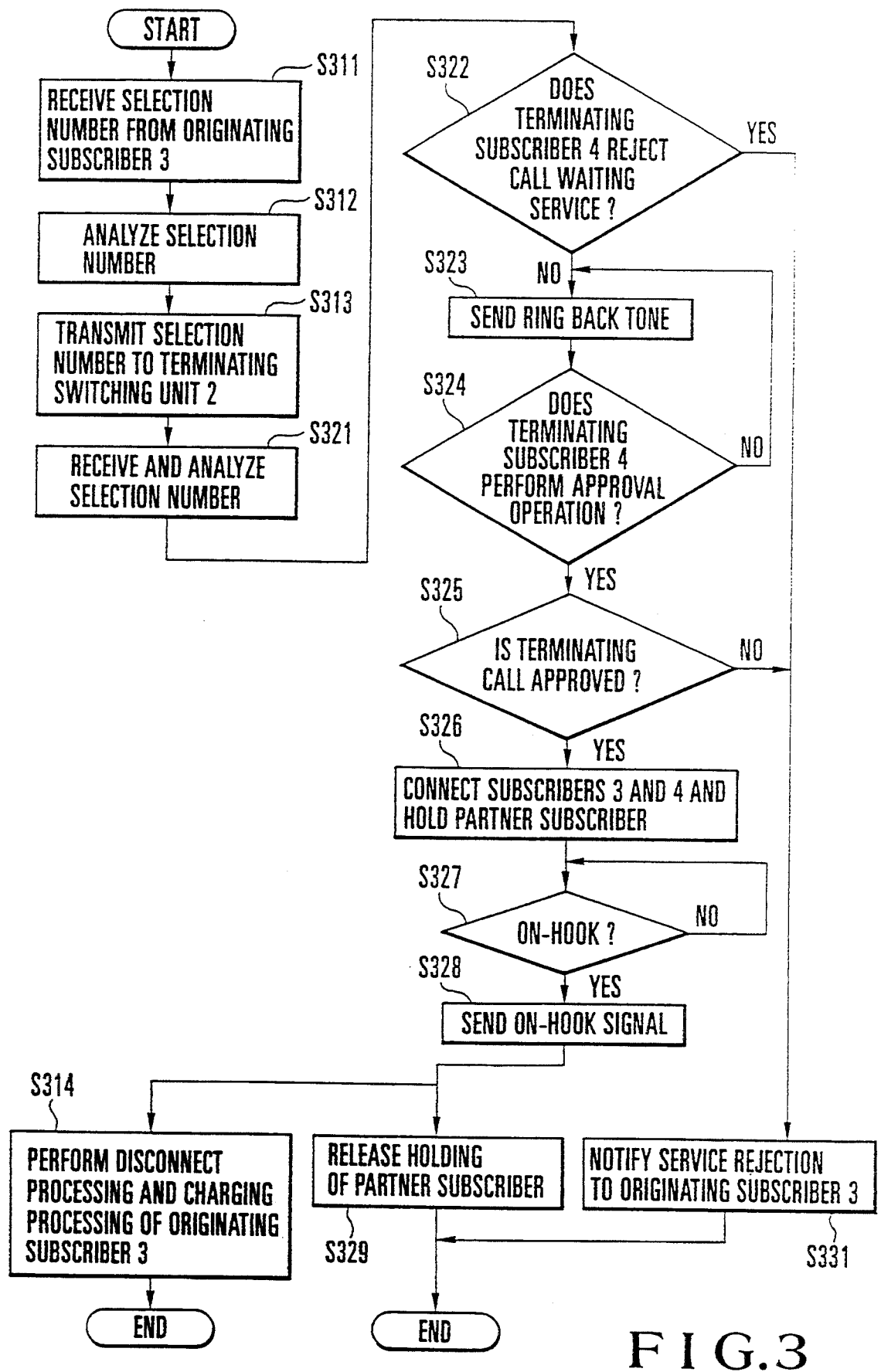
FIG. 3 is a flow chart for explaining an operation of the call waiting indicating system shown in FIG. 1.

The operation of this embodiment will be described with reference to a signal transmission/reception sequence between the originating switching unit 1 and the terminating switching unit 2 shown in FIG. 2 and a flow chart in FIG. 3. Assume that the terminating subscriber 4 is in a busy 101 state with the partner subscriber 8 through the trunk line 4. When the originating subscriber 3 confirms the busy state of the terminating subscriber 4 in the first call operation, the originating subscriber 3 performs a recall operation by dialing (102) the selection number consisting of the subscriber number of the terminating subscriber 4 and the predetermined special number for requesting the originating subscriber-initiated call waiting service.

The selection number dialed by the originating subscriber 3 is received by the selection number receiving means 11 in the originating switching unit 1 (step S311). The selection number receiving means 11 outputs the received selection number to the selection number analyzing means 12. The selection number analyzing means 12 analyzes the special number in the selection number output from the selection number receiving means 11 to determine whether the request is an originating subscriber-initiated call waiting service request (step S312). If YES in step S312, the selection number analyzing means 12 outputs the selection number to the numerical signal transmitting means 13, and the numerical signal transmitting means 13 performs transmission 103 of the selection number to the terminating switching unit 2 through the trunk line 5 (step S313).

In the terminating switching unit 2, the selection number receiving means 21 receives the selection number from the originating switching unit 1 an outputs it to the selection number analyzing means 22. The selection number analyzing means 22 analyzes the special number in the selection number to determine whether the connection request is the originating subscriber-initiated call waiting service request (step S321). If YES in step S321, the selection number analyzing means 22 starts the terminating connection control means 23. The started terminating connection control means 23 starts a terminating control operation on the basis of the selection number from the selection number receiving means 21 to start the terminating subscriber rejection determining means 24. The terminating subscriber rejection terminating means 24 retrieves subscriber information stored in the subscriber information memory 28 on the basis of a subscriber number in the selection number received by the selection number receiving means 21 whether the terminating subscriber 4 rejects connection requests provided by the originating subscriber-initiated call waiting service (step S322). In this case, if the terminating subscriber 4 is a public institution or ticket agency, speaking with the partner subscriber 8 is the top priority. Rejection of connection by the originating subscriber-initiated call waiting service is registered in the subscriber information in the subscriber information memory 28.

If YES in step S322, the terminating connection control means 23 starts the notification control means 25. The notification control means 25 notifies the originating subscriber 3 of information representing that the terminating subscriber 4 rejects connection requests of the call waiting service, to the originating subscriber 3 through the trunk line 5 and the originating switching unit 1 (step S331). On the other hand, when it is determined in step S322 that the terminating subscriber 4 does not reject connection requests of the call waiting service, the notification control means 25 sends a ringing signal to the terminating subscriber 4 for a predetermined period of time to perform notification 104 representing the presence of the connection request of the call waiting service. At the same time, the notification control means 25 sends a ring back tone to the originating subscriber 3 to notify the originating subscriber 3 of information representing that the terminating subscriber 4 is being called (step S323).

The terminating connection control means 23 starts the terminating approval determining means 26 to monitor the presence/absence of an approval operation of the terminating subscriber 4 (step S324). The terminating connection control means 23 also monitors a terminating approval signal consisting of a DTMF signal corresponding to, e.g., the hooking signal or special number, representing approval of call termination from the terminating subscriber 4 (step S325). At this time, when no OFF-hook state is detected in step S324, the flow returns to step S323 to repeatedly call the terminating subscriber 4 for a predetermined period of time. If a response rejecting call termination including no response is detected in response to the ringing signal (ring back tone) in step S325, i.e., when a terminating approval signal (OFF-hook signal) cannot be detected for a predetermined period of time or a special terminating rejection signal is detected, the flow advances to step S331.

On the other hand, if a response 106 represents approval of call termination in step S325, the terminating connection control means 23 controls the busy subscriber holding means 29 to temporarily hold the connection between the terminating subscriber 4 and the partner subscriber 8 in a busy state. The terminating connection control means 23 controls the network 220 to connect the originating subscriber 3 to the terminating subscriber 4 (step S326). The originating subscriber 3 is connected to the terminating subscriber 4 through the trunk line 5, and speech communication 109 is performed between these subscribers in the originating subscriber-initiated call waiting service. During the speech communication between the originating subscriber 3 and the terminating subscriber 4, notification 108 representing the holding state (i.e., a holding tone) is sent from the holding tone sending means 221 to the held partner subscriber 8 through the network 220 and the trunk line 6 under the control of the terminating connection control means 23. At the same time, the line status supervising means 210 is started by the terminating connection control means 23 to supervise the line status between the originating subscriber 3 and the terminating subscriber 4.

At the same time, the approval notifying means 27 transmits an approval signal to the originating switching unit 1 through the trunk line 5 to perform the notification 107 representing start of speech communication between the originating subscriber 3 and the terminating subscriber 4. In the originating switching unit 1, the approval signal receiving means 14 receives the approval signal from the terminating switching unit 2 to start the charging means 15. The charging means 15 performs charging processing of the originating subscriber 3 during the speech communication between the originating subscriber 3 and the terminating subscriber 4 on the basis of the call time and distance between the originating subscriber 3 and the terminating subscriber 4. When the speech communication between the originating subscriber 3 and the terminating subscriber 4 is completed, the line status supervising means 210 detects ON-hook 110 (step S327). The ON-hook notifying means 211 sends an ON-hook signal 111 in accordance with the ON-hook detection output from the line status supervising means 210, and at the same time controls the busy subscriber holding means 29 to release holding of the partner subscriber 8 (step S329). The partner subscriber 8 is connected to the terminating subscriber 4 through the network 220 to initiate speech communication 112 between them.

In the originating switching means 1, an ON-hook signal from the terminating switching unit 2 is received by the ON-hook means 16 to output an end signal for charging processing to the charging means 15. At the same time, disconnect processing for connection with the originating subscriber 3 is performed (step S314).

When the line status supervising means 210 monitors ON-hook 113 between the partner subscriber and the terminating subscriber 4, the ON-hook means 212 sends a disconnect signal 114 to the partner switching unit 7 through the network 220 and the trunk line 5 in accordance with the ON-hook detection output from the line status supervising means 210. At the same time, terminating connection control means 23 performs disconnect processing for connection with the terminating subscriber 4.

In the originating switching unit 1, the signal receiving means 14 receives the disconnect signal from the terminating switching unit 2 to notify the charging means 15 and the ON-hook means 16 of the end of call. The charging means 15 ends charging processing for the originating subscriber 3, and the ON-hook means 16 performs disconnect processing for connection with the originating subscriber 3 (step S314). Note that when the originating subscriber 3 performs an ON-hook operation first, the ON-hook means 16 detects this to notify the charging means 15 of the end of call.

As has been described above, according to the present invention, when an originating subscriber dials a terminating subscriber number following a special number for the call waiting service, the originating subscriber can speak to the busy terminating subscriber, thereby realizing the originating subscriber-initiated call waiting service and hence improving the telephone services. In addition, the service fees in speech communication between the originating and terminating subscribers are charged to the originating subscriber. Therefore, even if the terminating subscriber is initially speaking to another subscriber, an excessive service fee is not charged to the terminating subscriber.

What is claimed is:

1. A call waiting indicating method, comprising the steps of:
  receiving a selection number consisting of a terminating subscriber number and a predetermined special number dialed by an originating subscriber and requesting an originating subscriber-initiating call waiting service;
  analyzing the received selection number to determine whether a terminating subscriber corresponding to the terminating subscriber number rejects the originating subscriber-initiated call waiting service;
  notifying a connection request to a busy terminating subscriber speaking to a partner subscriber when it is determined that the terminating subscriber does not reject the originating subscriber-initiated call waiting service;
  detecting a response representing an approval signal from the busy terminating subscriber in response to notification of the connection request; and
  temporarily holding the partner subscriber upon detection of the approval signal from the terminating subscriber, and driving a network to connect the terminating subscriber to the originating subscriber.

2. A method according to claim 1, further comprising the step of starting charging processing for the originating subscriber when the terminating subscriber is connected to the originating subscriber, and the step of completing the charging processing of the originating subscriber when speech communication between the originating and terminating subscribers is completed.

3. A method according to claim 1, further comprising the step of notifying the originating subscriber of information representing that the originating subscriber-initiated call waiting service is rejected, when it is determined that the terminating subscriber rejects the originating subscriber-initiated call waiting service.

4. A method according to claim 1, further comprising the step of notifying the originating subscriber of information representing that the originating subscriber-initiated call waiting service is rejected, when the approval signal in response to the notification of the connection request from the terminating subscriber is not detected within a predetermined period of time.

5. A method according to claim 1, wherein the analyzing the received selection number to determine whether a terminating subscriber corresponding to the terminating subscriber number rejects the originating subscriber-initiated call waiting service includes the step of accessing a subscriber information memory for storing subscriber information including information representing rejection of the originating subscriber-initiated call waiting service for each subscriber.

6. A method according to claim 1, further comprising the step of releasing temporal holding of the partner subscriber at an end of speech communication between the originating and terminating subscribers, and connecting the originating subscriber to the partner subscriber again.

7. A method according to claim 1, further comprising the step of notifying the originating subscriber of information representing that connection is requested to the terminating subscriber, when the connection request is notified to the originating subscriber.

8. A call waiting indicating system comprising:
an originating switching unit including
first selection number receiving means for receiving a selection number consisting of a special number and a terminating subscriber number from an originating subscriber,
first selection number analyzing means for analyzing the selection number received by said first selection number receiving means and determining whether the special number in the selection number is a number for requesting an originating subscriber-initiated call waiting service, and
selection number transmitting means for transmitting the selection number to a trunk line when the special number represents the number for requesting the originating subscriber-initiated call waiting service in accordance with a determination result of said first selection number analyzing means; and
a terminating switching unit including second selection number receiving means for receiving the selection number from said originating switching unit through said trunk line;
second selection number analyzing means for analyzing the selection number received said second selection number receiving means and determining whether the special number in the selection number is the number for requesting the originating subscriber-initiated call waiting service;
terminating connection control means for performing termination connection control to the terminating subscriber represented by the terminating subscriber number in the selection number when the special number is the number for requesting the originating subscriber-initiated call waiting service in accordance with a determination result of said second selection number analyzing means;
switching connecting means, controlled by said terminating connection control means, for performing switching connection between the originating and terminating subscribers;
terminating subscriber rejection determining means for determining whether the terminating subscriber represented by the terminating subscriber number in the selection number received by said second selection number receiving means rejects the originating subscriber-initiated call waiting service;
notification control means for notifying the terminating subscriber of the presence of a connection request of the originating subscriber-initiating call waiting service; when said terminating subscriber rejection determining means determines that the terminating subscriber does not reject the originating subscriber-initiated call waiting service;
terminating approval determining means for determining approval of the call waiting service by the terminating subscriber, in response to connection request notification from said notification control means; and
busy subscriber holding means for temporarily holding a partner subscriber set in a busy state with the terminating subscriber when said terminating approval determining means determines the approval of the call wait service of the terminating subscriber;
said terminating switching unit being arranged such that when said busy subscriber holding means holds the partner subscriber, said terminating control means controls said switching connecting means to connect the terminating subscriber to the originating subscriber.

9. A system according to claim 8, wherein said terminating switching unit comprises an approval signal notifying means for sending a call start signal to said originating switching unit when said terminating approval determining means determines the approval of the call wait service of the terminating subscriber, line status supervising means for detecting an end of speech communication between the originating and terminating subscribers, and ON-hook notifying means for sending an ON-hook signal to said originating switching unit when said line status supervising means detects the end of the speech communication, and said originating switching unit comprises charging means for starting a charging operation for the originating subscriber in accordance with the call start signal from the approval signal notifying means and ending the charging operation in accordance with an ON-hook signal from said ON-hook notifying means.

10. A system according to claim 8, wherein said notification control means notifies the originating subscriber of information representing that the originating, subscriber-initiated call waiting service is rejected, when said terminating subscriber rejection determining means determines that the terminating subscriber rejects the originating subscriber-initiated call waiting service.

11. A system according to claim 8, wherein said notification control means notifies the originating subscriber of information representing that the originating subscriber-initiating call waiting service is rejected, when said terminating approval determining means cannot determine the approval of the call waiting service by the terminating subscriber within a predetermined period of time.

12. A system according to claim 8, further comprising a subscriber information memory for storing subscriber information including information representing rejection of the originating subscriber-initiated call waiting service for each subscriber, and wherein said terminating subscriber rejection determining means determines with reference to the subscriber information in said subscriber information memory whether the terminating subscriber rejects the originating subscriber-initiating call waiting service.

* * * * *